(No Model.)
W. STANLEY, Jr.
METHOD OF ELECTRICAL DISTRIBUTION AND CONVERSION.
No. 372,944. Patented Nov. 8, 1887.
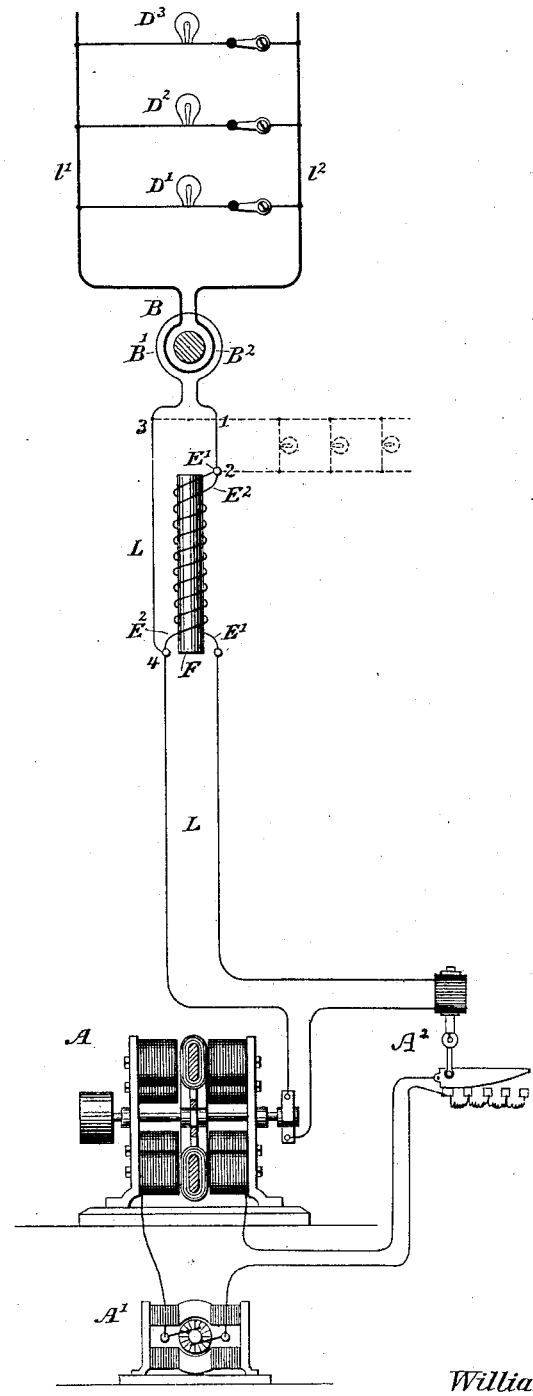
Witnesses
Geo. W. Breck
Ulysses W. Cook
Inventor
William Stanley Jr.,
By his Attorneys
Pope & Edgecomb

UNITED STATES PATENT OFFICE.

WILLIAM STANLEY, JR., OF GREAT BARRINGTON, MASSACHUSETTS, ASSIGNOR TO GEORGE WESTINGHOUSE, JR., OF PITTSBURG, PENNSYLVANIA.

METHOD OF ELECTRICAL DISTRIBUTION AND CONVERSION.

SPECIFICATION forming part of Letters Patent No. 372,944, dated November 8, 1887.

Application filed November 23, 1885. Serial No. 183,726. (No model.)

*To all whom it may concern:*

Be it known that I, WILLIAM STANLEY, Jr., a citizen of the United States, residing in Great Barrington, in the county of Berkshire and State of Massachusetts, have invented certain new and useful Improvements in Methods of Electrical Distribution and Conversion, of which the following is a specification.

My invention relates to a method of distributing and converting electric energy, wherein alternating or intermittent currents derived from any convenient source of energy are transmitted to a point more or less distant, and are there employed in the production of currents of high potential—as, for instance, through the instrumentality of an induction - coil—which act upon translating devices—such, for instance, as incandescing electric lamps. In the ordinary operation of such a system as that hereinbefore described, if the whole or any part of the translating devices are withdrawn or removed from the secondary circuit of an induction-coil the resistance of such circuit is altered. Such a change of resistance in the secondary circuit at once gives rise to a variation in the counter electro-motive force developed by the action of the primary current in the primary circuit of the inductorium, hereinafter termed the "converter," which is due directly to the increment or decrement of magnetization in the iron core. By this means a variation of the strength of current traversing the primary coil is effected, which in turn gives rise to a proportional variation in the electro-motive force of the induced currents in the secondary circuit.

The object of this invention is to provide an automatic method of regulation, whereby a constant difference of potential may at all times be maintained in the secondary circuit or circuits of the apparatus irrespective of the amount of work which is being done therein, from which it results that the mechanical energy consumed in operating the system may be materially economized.

In general terms, the invention consists in causing a current of variable strength to traverse one coil of the converter, and automatically regulating, through the instrumentality of the counter electro-motive force developed within the converter itself, the current generated, and in causing the counter electro-motive force to be dependent upon the variations in resistance in the secondary circuit. To accomplish this result there is included in the main or primary circuit of the apparatus an electric generator, which must be capable of producing an approximately constant electric current in a closed circuit of varying resistance, together with a regulator, which comprises one or more pairs of differential helices normally tending to produce nearly equal and opposite magnetisms in a soft-iron core. This is so arranged as to constitute an automatic current-regulating device for the converter proper. The primary coil of the converter is placed in multiple arc with one of these opposing coils. Assuming in the first instance the secondary circuit of the converter to be open, its resistance will be infinite, and hence there will be developed in the primary coil a counter electro - motive force or inductive resistance of maximum value. This will cause the primary current to traverse both the regulating-coils included in the primary circuit by reason of the inductive resistance encountered in the primary coil of the converter, which in effect shunts one of the two normally-opposing coils of the regulator. The effect of this current upon the iron core of the converter, which is surrounded by the primary coil, will be nearly null, so that little or no effective magnetism will be developed therein. If, now, the circuit of the secondary coil of the converter be completed by a conductor offering a given resistance, the counter electro-motive force developed in the primary circuit of the converter will be correspondingly diminished. If another conductor be attached to the secondary parallel or in multiple arc with the first, or its resistance in any other manner be diminished, the counter electro-motive force of the primary will necessarily be reduced in the same proportion.

Now, it is essential to the successful operation of the apparatus that the difference of potential at the respective terminals of the secondary coil of the converter be maintained approximately constant, and this without reference to any changes of resistance which may occur in its external circuit. For this purpose it is necessary to correspondingly vary the effective strength of current traversing the primary circuit, which is in effect the same thing as the maintaining of a constant difference of potential between the opposite terminals of the primary coil. This is to a certain extent accomplished by the automatic action of the apparatus itself, for the reason that each successive decrement in the counter electro-motive force causes the primary coil to offer less and less resistance to the shunted primary current, so that, acting as it does as a shunt for one of the main-line coils, the primary coil will receive a continually increasing proportion of the whole current. The moment that the normal inductive balance between the two opposing coils of the regulator is disturbed the coil preponderating over the other acts to it as a primary to a secondary coil, and vice versa, so that the value of the current shunted is not simply that due to Ohm's law, but in addition that which is due to the electro-motive force developed within the weaker coil by the inductive action of the core under the influence of the stronger one. As the actual amount of work done or energy absorbed increases in the secondary coil, the effective strength of current derived from the primary generator must also be increased. Now, as the resistance of the shunt increases and the current is partially diverted from the shunted regulator-coil, the equilibrium between the magnetic forces developed in the iron core surrounded by these coils is disturbed, and a counter electro-motive force is developed in these coils. If this counter electro-motive force is increased, it is obvious that a higher electro-motive force must be used to force a unit of current through the primary circuit, and under the conditions hereinafter stated the primary generator automatically supplies this increase. This electro-motive force therefore varies inversely as the resistance of the primary circuit of the converter, but is directly proportionate to the work required to be done in the secondary circuit.

It has been stated that the primary generator is so constructed as to maintain a constant current in its own circuit, and hence the potential maintained at the terminals of the secondary circuit will necessarily remain constant.

The accompanying drawing is a diagram illustrating an organization of circuits suitable for carrying out the invention.

Referring to the drawing, A represents a magneto or a dynamo electric generator or other convenient source of electricity. The generator is designed to transmit alternating or intermittent currents upon a main line, L, and it is constructed in any well-known or suitable manner for the purpose of automatically maintaining a constant current in its external circuit under conditions of varying resistance. An alternating machine whose field-magnets are supplied by a dynamo, $A'$, and provided with any suitable system of automatic regulation, as indicated at $A^2$, will be found well adapted to this purpose. An induction apparatus, B, of suitable character, herein termed a "converter," has its primary coil $B'$ included in the primary circuit L. The secondary coil $B^2$ is included in a secondary circuit, $l'$ $l^2$, in which any desired translating device—such, for instance, as incandescent electric lamps $D'$, $D^2$, and $D^3$, &c.—may be included in multiple arc, as shown in the figure. As the various translating devices are inserted or withdrawn from the secondary circuit the resistance of the said circuit is varied, and the counter electro-motive force developed in the primary circuit is also varied.

In the distribution of electric currents for various purposes in the manner hereinbefore set forth, especially for electric lighting, it is important that the difference of potential at the terminals of the secondary coil of the converter shall be maintained at a constant value irrespective of any change which may occur in the resistance of the circuit. Such variations, however, affect the counter electro-motive force in the primary circuit, and thus tend to vary the effective current traversing the same, and again to cause the electro-motive force developed in the secondary to be likewise varied, and even if the generator be so constructed as to force an approximately constant current through the primary, this alone will not remove the difficulty but will tend rather to augment it. It is essential, therefore, that means be provided for varying the amount of current traversing the coil $B'$ as the resistance of the circuit $l'$ $l^2$ is increased or decreased, or, what is in effect the same thing, for maintaining a constant difference of potential between the opposite terminals of the coil $B'$, so that when the resistance of the secondary is reduced to a minimum a maximum current will traverse the primary coil $B'$, and, on the other hand, when the secondary circuit is entirely open or disconnected a minimum current will traverse the primary, while between these limits the effective strength of the current in the primary circuit shall vary in direct proportion to the resistance offered by the secondary. For this purpose two opposing coils, $E'$ and $E^2$, are applied, by means of any suitable or convenient arrangement of differential winding, to a soft-iron core, F, and both these differential or normally-opposing coils are included in the primary or generator circuit. A current traversing both of these coils tends to develop equal and opposite polarities in the iron core, and therefore no magnetic effects whatever are developed. The conductor 1, leading from one terminal of the primary coil $B'$, connects at a point, 2, between the two regulator-coils $E'$ and $E^2$. A conductor, 3, leading from the remaining terminal of the primary coil, connects with the remaining terminal of the regulator-coil $E^2$ at the point 4. In this manner the primary coil $B'$ serves, in effect, as a shunt or bridge for the regulator-coil $E^2$. It results from this that the effective strength of current traversing the regulator-coil $E^2$ is determined by the resistance offered by the coil $B'$, and it will vary proportionately to the variations in the resistance of the last-mentioned coil. Thus if the counter electro-motive force (sometimes called the "inductive resistance") in the coil $B'$ be at its maximum, approximately the whole of the current of the primary circuit will traverse the regulator-coil $E^2$, and the resultant effect of the current in the two coils $E'$ and $E^2$ will be nearly zero or null, so that little or no magnetism will be developed in the iron core F. Thus a minimum amount of energy will be absorbed in generating the current traversing the primary circuit, and the dynamo-generator will offer practically no mechanical resistance to its driving-motor. Assuming now that a single translating device—for instance, an electric lamp, $D'$—be included in the circuit of the secondary, then the counter electro-motive force or inductive resistance will be correspondingly diminished in the primary coil $B'$, and a proportionate amount of current will be diverted from the regulator-coil $E^2$ through the coil $B'$. This will give rise to a difference of potential between the terminals of the secondary coil of the converter. At the same time it will disturb the magnetic equilibrium of the core F, and a counter electro-motive force will be established in the surrounding coils, whose value will equal $E'=E^2$ or $E'=E^2+1$ lamp. The generator, by virtue of its inherent or automatic regulating capacity, immediately increases its electro-motive force in order to maintain the strength of current in the primary circuit. A still further reduction in the resistance of the secondary circuit (as, for instance, by the introduction in multiple arc of a second lamp, $D^2$) will cause a further decrement in the counter electro-motive force of the primary $B'$, and a still further increment in the effective strength of the current traversing the primary will be occasioned. This in turn augments the counter electro-motive force in the coils $E'$ and $E^2$, on account of $E'$ equaling $E^2+2$ lamps—that is, because $E'-E^2$ is greater than before. An approximately constant difference of potential will therefore be maintained between the terminals of the primary as well as of the secondary coils throughout the entire range of working.

According to the previous methods of regulation, when a constant current is required to be delivered through a line, it has been necessary to depend upon the magnetic supersaturation of the core of the induction-coil by the primary current, which necessitates an expenditure of some fifty per cent. of the available electric energy in an extra field of force. By the system hereinbefore described a given percentage of useful effect may be obtained throughout the entire range of working, as the loss arising from imperfect regulation is comparatively unimportant.

In practice I have found that the lamps may be included in multiple arc between the conductors 1 and 3, as indicated in dotted lines, the induction-coil being dispensed with and the ends of the two conductors 1 and 3 being disconnected from each other. The changes in resistance, occasioned by introducing and withdrawing the lamps between the conductors 1 and 3, will then modify the counter electro-motive force due to the magnetization of the core F. A sufficient difference of potential will thus be occasioned between the points 2 and 4 to operate the lamps, and this difference of potential will be directly dependent upon the lamps in circuit.

I claim as my invention—

The hereinbefore-described method of electric regulation and distribution, which consists in generating currents, converting the same into currents of different potential, translating the last-named currents into energy of a different form, varying the resistance encountered by the first-named currents inversely as the resistance encountered in converting the currents into currents of different potential is varied, and varying the resistance encountered in conversion directly as the resistance encountered in translating the last-named currents into another form of energy is varied.

In testimony whereof I have hereunto subscribed my name this 17th day of November, A. D. 1885.

WILLIAM STANLEY, JR.

Witnesses:
    DANL. W. EDGECOMB,
    CHARLES A. TERRY.